(12) United States Patent
Nishioka et al.

(10) Patent No.: US 7,172,405 B2
(45) Date of Patent: Feb. 6, 2007

(54) METAL MOLD DEVICE FOR BLOW MOLDING

(75) Inventors: Kazumichi Nishioka, Akaiwa-gun (JP); Naoshige Fukuhara, Akaiwa-gun (JP); Naoaki Tachibana, Akaiwa-gun (JP)

(73) Assignee: Minoru Kasei Company, Limited, Hyogo (JP)

( * ) Notice: Subject to any disclaimer, the term of this patent is extended or adjusted under 35 U.S.C. 154(b) by 404 days.

(21) Appl. No.: 10/478,456

(22) PCT Filed: May 20, 2002

(86) PCT No.: PCT/JP02/04864

§ 371 (c)(1),
(2), (4) Date: Nov. 21, 2003

(87) PCT Pub. No.: WO02/100625

PCT Pub. Date: Dec. 19, 2002

(65) Prior Publication Data
US 2004/0126456 A1   Jul. 1, 2004

(30) Foreign Application Priority Data
May 23, 2001   (JP)   ............... 2001-154031

(51) Int. Cl.
*B29C 49/64*   (2006.01)
*B29C 33/04*   (2006.01)

(52) U.S. Cl. ........................ 425/526; 249/79

(58) Field of Classification Search ................ 425/522, 425/526; 249/79, 81; *B29C 49/64, 33/04*
See application file for complete search history.

(56) References Cited

U.S. PATENT DOCUMENTS 2,326,041 A  *  8/1943  Lavallee ................. 264/526

(Continued)

FOREIGN PATENT DOCUMENTS

GB   2239626 A  *  7/1991

(Continued)

OTHER PUBLICATIONS

Rosato et al, Injection Molding Handbook, 2nd Edition, 1995, p. 668, figure 9-14.*

(Continued)

*Primary Examiner*—Robert B. Davis
(74) *Attorney, Agent, or Firm*—Koda & Androlia

(57) ABSTRACT

Fluid flow grooves (11) with a flat cross section being formed between the back surface of a metal mold (2) for blow molding and a back-up member (4) which adheres tightly to this back surface. A plurality of these fluid flow grooves (11) are provided, and these fluid flow grooves are disposed densely in parallel with partition walls (21) interposed between the grooves. Fluid inlets (12) and outlets (13) are formed in the respective fluid flow grooves (11). A heating fluid or cooling fluid enters the respective fluid flow grooves (11) via the inlets (12) from a fluid supply manifold (14). The fluid flows out of the outlets (13), enters a fluid discharge manifold (15), and is discharged to the outside. Rapid heating and rapid cooling of the metal mold (2) are performed, no irregularity occurs in temperature, and the cycle time can be shortened, so that a metal mold device for blow molding in which the energy consumption is small can be obtained.

6 Claims, 7 Drawing Sheets

U.S. PATENT DOCUMENTS

| | | | | |
|---|---|---|---|---|
| 3,020,595 | A | * | 2/1962 | Szajna ........................ 249/79 |
| 3,249,672 | A | * | 5/1966 | Richards et al. ............ 264/219 |
| 3,768,948 | A | * | 10/1973 | Horberg et al. ............. 425/526 |
| 3,978,910 | A | * | 9/1976 | Gladwin ...................... 164/443 |
| 4,872,827 | A | * | 10/1989 | Noda .......................... 425/526 |
| 6,843,646 | B2 | * | 1/2005 | Ryan et al. .................. 425/195 |

FOREIGN PATENT DOCUMENTS

| | | | |
|---|---|---|---|
| JP | 04086212 A | * | 3/1992 |
| JP | 6-73589 | | 3/1994 |
| JP | 06238728 A | * | 8/1994 |
| JP | 7-214568 | | 8/1995 |
| JP | 9-164583 | | 6/1997 |
| JP | 10-235722 | | 9/1998 |

OTHER PUBLICATIONS

Menig, Mold Making Handbook, 2nd edition, 1998, pp. 117-118.*
Rosato et al, Blow Molding Handbook, 1989, pp. 282-285.*

* cited by examiner (a)

(b)

METAL MOLD DEVICE FOR BLOW MOLDING

TECHNICAL FIELD

The present invention relates to a metal mold device which is for blow molding and is equipped with heating and/or cooling means.

BACKGROUND ART

In cases where high transfer properties and high-speed molding are required in blow molding, heating and cooling means are installed in the metal mold. More specifically, the metal mold is heated by the heating means before the parison is supplied, and the outer surfaces of the parison in a softened state are caused to contact the inside surfaces of the heated mold so that high transfer properties are obtained. Furthermore, following this contact, the metal mold is forcibly cooled by the cooling means, so that the blow-molded body can be quickly hardened and removed, thus shortening the cycle time. If high-speed heating and high-speed cooling of the metal mold are possible, then the cycle time can be shortened.

The following means are known as the above-described heating and cooling means:

(1) Means in which heating and cooling of the metal mold are accomplished by laying pipes along the back surfaces of the metal mold, and alternately circulating a heating fluid (e.g., high-temperature water or high-temperature steam) and a cooling fluid (e.g., cooling water) through these pipes. In this case, it is difficult to lay pipes so that these pipes adhere tightly to the back surfaces of the metal mold along the entire length of the pipes; furthermore, since the pipes are round, the contact area with the metal mold is also small. Accordingly, the heat exchange efficiency is poor, and the heating and cooling rates cannot increase.

(2) Means in which pipes (consisting of a metal whose melting point is higher than that of the metal mold) are disposed inside the casting mold when the metal mold is cast, so that pipes are cast inside the walls of the metal mold. In this case, gaps are formed between the cast pipes and metal mold during use. Furthermore, since the pipes are round, the contact area with the metal mold is small in relation to the cross-sectional area of the pipes. As a result, the heat exchange efficiency is poor; and in addition, since the thickness of the metal mold must be increased, the thermal capacity of the metal mold increases, and the heating and cooling rates do not increase.

(3) Means in which drill holes are formed vertically and horizontally inside the walls of the metal mold from the back surfaces of the metal mold, and are caused to communicate with each other, and a heating or cooling fluid is circulated through these holes. In this case, the advantage of direct contact of the heating or cooling fluid with the metal mold is obtained. However, since the drill holes are round so that the contact area between the metal mold and the fluid is small in relation to the cross-sectional area, the heat exchange efficiency is poor. In addition, since the thickness of the metal mold must be large, the thermal capacity of the metal mold is large. Moreover, since the drill holes can only be formed in a rectilinear configuration, it may be impossible (depending on the shape of the metal mold) to form the required number of holes, so that the heating and cooling rates cannot increase.

(4) Means in which spaces are formed on the back surface sides of the metal mold, and the metal mold is heated or cooled by circulating a heating or cooling fluid through these spaces (see Japanese Patent Application Laid-Open (Kokai) No. 9-164583). In this case, since the heating or cooling fluid is circulated through large spaces, a large quantity of fluid is required, and the thermal capacity of the metal mold as a whole surrounding the spaces is also large; as a result, a large quantity of energy is consumed. In addition, since the fluid loiters (has a slow flow velocity) inside the spaces, the heat exchange efficiency is poor, and the heating and cooling rates cannot increase.

(5) Means in which thin plate bodies that form a cavity are disposed on the joining surfaces of the metal mold main body, and a narrow gap is formed between the metal mold main body and the thin plate bodies, and cooling of the metal mold is accomplished by causing a cooling medium to flow through this gap (see Japanese Patent Application Laid-Open (Laid-Open (Kokai)) No. 10-235722). In this case, though rapid cooling of the thin plate bodies that form the cavity is possible, non-uniform flow of the cooling medium occurs inside the gap, and the cooling rate varies according to the position, thus tending to cause irregularities in the metal mold temperature.

DISCLOSURE OF INVENTION

The present invention is made in light of the above-described problems in conventional heating and cooling means; and the object of the present invention is to provide a metal mold device for blow molding in which sufficiently rapid heating and sufficiently rapid cooling of the metal mold are accomplished, no irregularity occurs in the metal mold temperature, and the amount of energy that is consumed can be small.

In the metal mold device for blow molding of the present invention, fluid flow grooves with a flat cross section are formed between the back surface of a metal mold which is used for blow molding and a back-up member which is disposed so as to adhere tightly to the back surface, the fluid flow grooves are provided in a plurality of numbers and are disposed so that the grooves are densely concentrated with partition walls interposed, and fluid inlet openings and outlet openings are formed in each of the fluid flow grooves; and heating or cooling of the metal mold is accomplished by causing a heating fluid or cooling fluid to flow through each of the fluid flow grooves. Though this goes without saying, the above-described flat fluid flow grooves are flattened along the back surface of the metal mold.

The above-described inlets and outlets can be formed in the back-up member. In addition, the inlets and outlets of the respective fluid flow grooves can be caused to communicate with the piping of a fluid supply or discharge manifold, so that the fluid is supplied or discharged via these manifolds. It is preferable that the manifolds be disposed inside the metal mold structural body on the back surface side of the metal mold (these manifolds can be formed in a back-up member disposed inside the metal mold structural body), and that the manifolds be caused to communicate with an external fluid source. It is desirable that the back-up member be formed from a material that has a lower thermal conductivity than the metal mold.

In the above-described metal mold device for blow molding, either heating or cooling alone of the metal mold can be performed, or a cycle of heating and cooling can be repeated. High transfer properties can be obtained by supplying a heating fluid (e.g., high-temperature water or high-temperature steam) prior to the supply of the parison so that the metal mold is heated and by causing the outside surfaces of the parison in a softened state to contact the heated inside surfaces of the metal mold. Meanwhile, if the heated metal mold is cooled by supplying a cooling fluid (e.g., cooling water) after the parison has contacted the inside surfaces of the metal mold, the blow-molded article can be quickly cooled and hardened, so that the molded article can be quickly removed from the metal mold. Accordingly, the cycle time can be shortened so that high-speed molding is accomplished. Furthermore, by way of alternately performing heating and cooling, high transfer properties and high-speed molding are both achieved.

BEST MODE FOR CARRYING OUT THE INVENTION

The metal mold device for blow molding according to the present invention will be described below with reference to the schematic diagrams shown in FIGS. 1 through 4.

Figure 1:
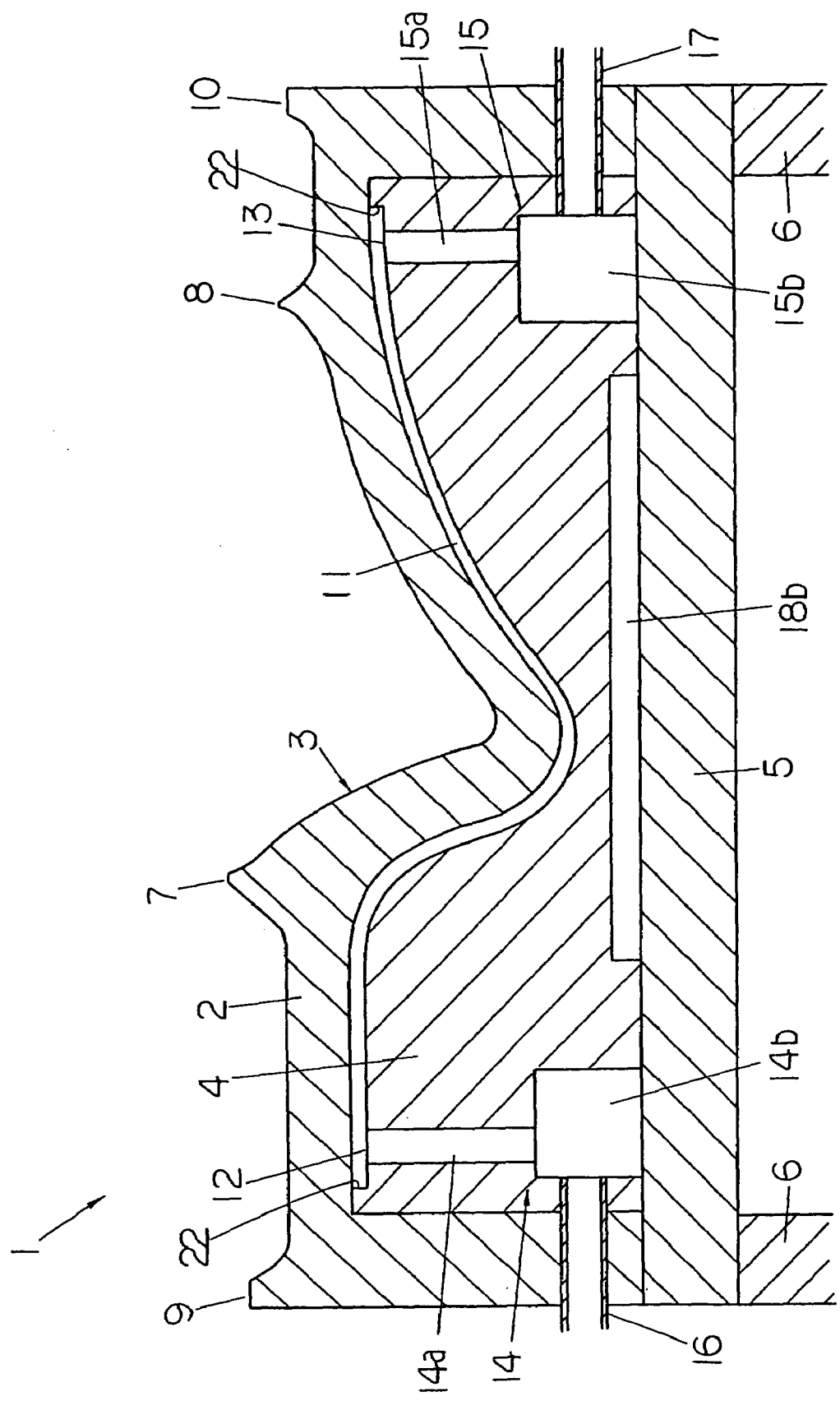
FIG. 1 is a horizontal sectional view (a sectional view along the line I—I in FIG. 3) which shows in schematic terms the metal mold device for blow molding according to the present invention.
Figure 2:
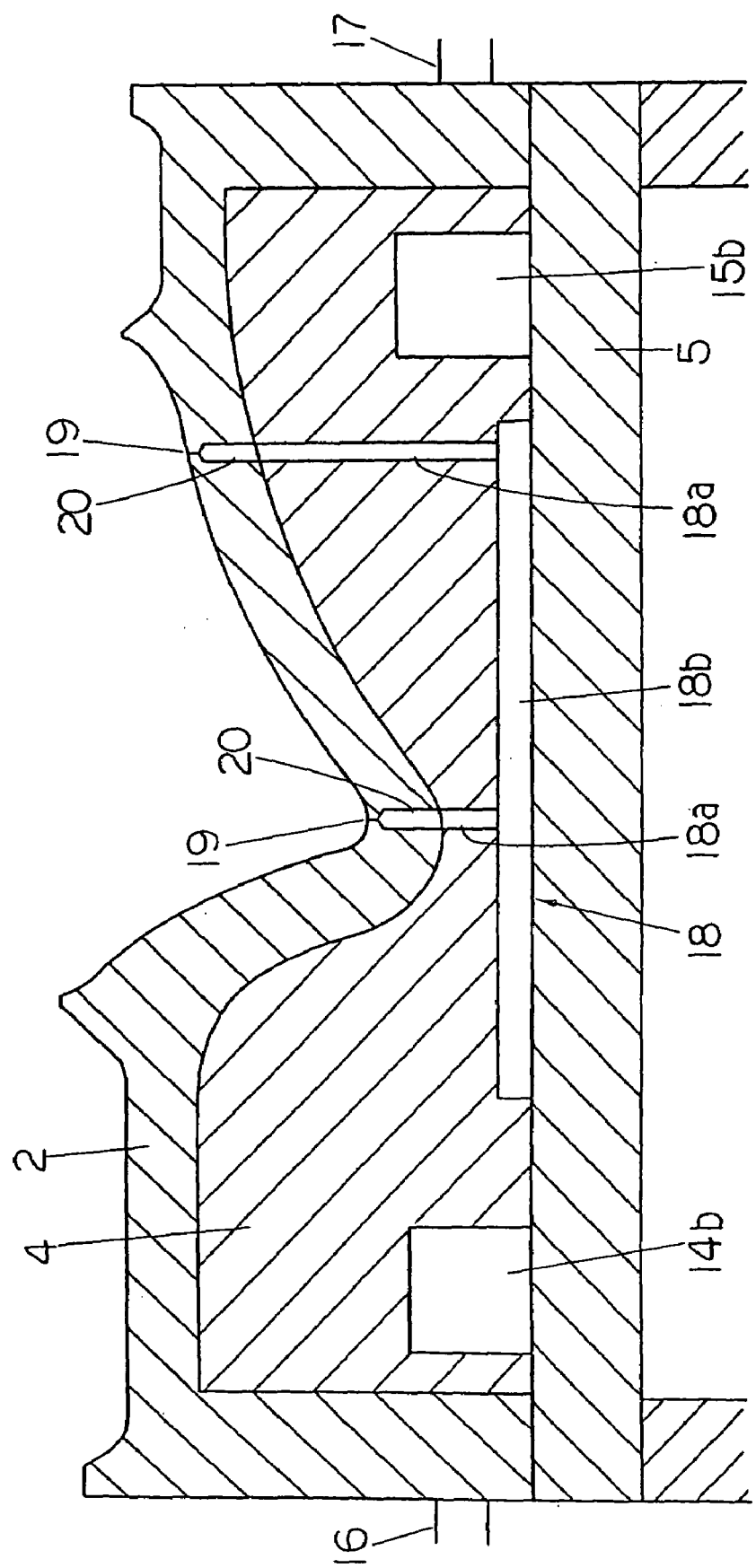
FIG. 2 is a horizontal sectional view (along the line II—II in FIG. 3) of the metal mold device in a separate location.

The metal mold device 1 for blow molding shown in FIG. 1 (only one side is shown) comprises a metal mold 2 which has a cavity portion 3, a back-up member 4 which is disposed inside the metal mold structural body and on the back surface side of the metal mold 2, a back plate 5 which supports the back of the metal mold 2, and reinforcing members 6 which support the back plate 5 and are connected to an opening-and-closing mechanism, etc. The above-described cavity portion 3 is in the area surrounded by pinch-off portions 7 and 8, and contact portions 9 and 10 are formed on the left and right ends of the metal mold 2. The pinch-off portions 7 and 8 are the areas where cutting of the parison is performed. The contact portions 9 and 10 contact the contact portions of a metal mold (not shown in the drawings; a cavity space is formed by one pair of metal molds) which is disposed so as to face the above-described metal mold 2, and such contact portions 9 and 10 demarcate the closest positions of the two metal molds. The contact portions 9 and 10 also act to prevent damage that might be caused by the pinch-off portions 7 and 8 that contact the pinch-off portions of the facing metal mold. In the above metal mold device 1 for blow molding, the parison is disposed perpendicular to the drawing sheet surface.

Figure 3:
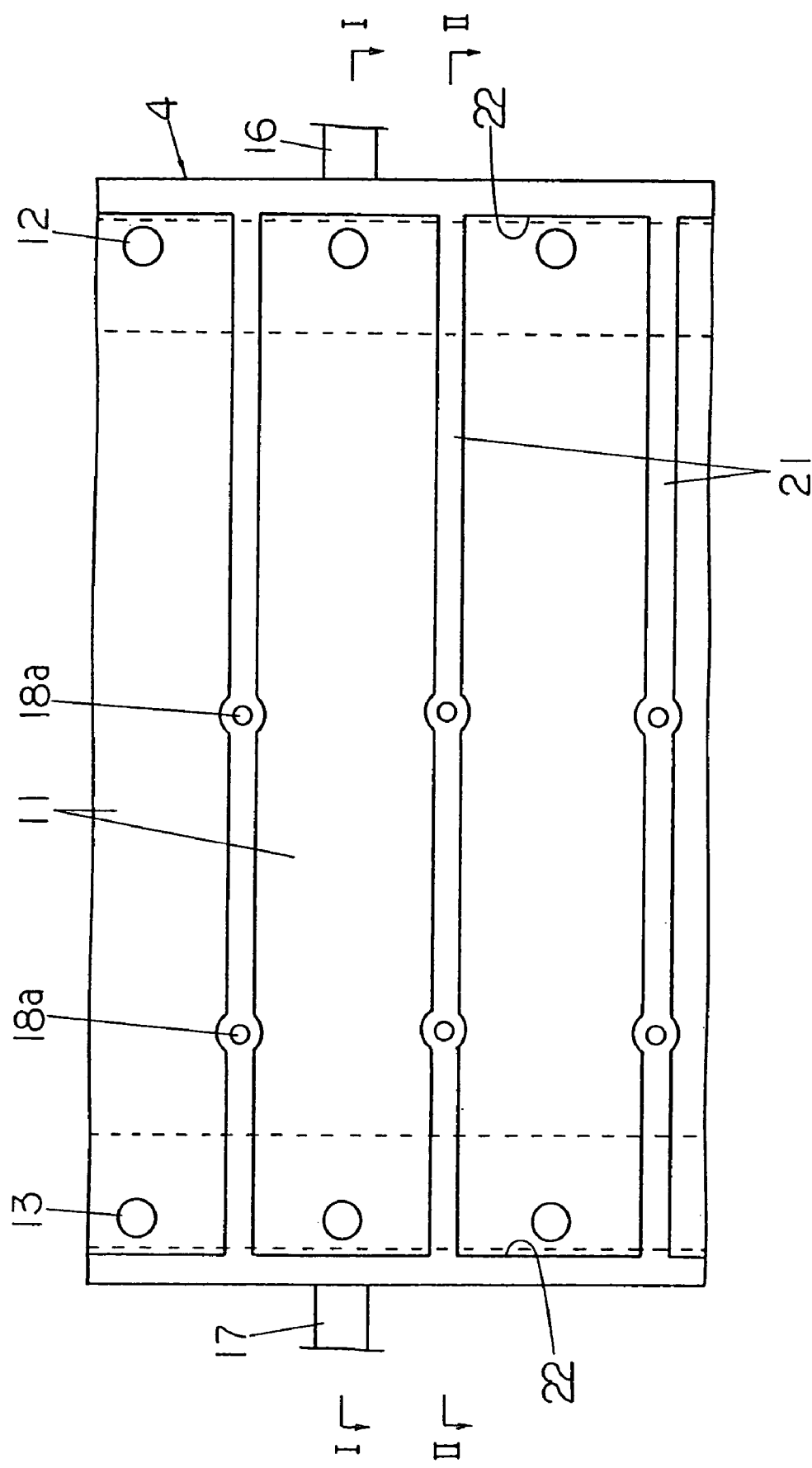
FIG. 3 is a side view of the back-up member.

The surface of the back-up member 4 adheres tightly to the back surface of the metal mold 2 and is disposed completely inside the structural body of the metal mold. A plurality of flattened recessed grooves 11 are formed substantially parallel to each other in the surface of the back-up member 4, over substantially the entire left-right length of the back-up member 4 as shown in FIG. 3, and these recessed grooves 11 are densely concentrated with partition walls 21 which have a narrow width and are interposed between the grooves. The respective recessed grooves 11 are surrounded by the partition walls 21 and dikes 22 which are formed on the periphery of the surface of the back-up member 4; and in the left and right end portions of each recessed groove 11, an inlet 12 is formed at one end and an outlet 13 is fanned at the other end. The respective inlets 12 communicate with a fluid supply manifold 14 which is formed inside the back-up member 4, and the respective outlets 13 communicate with a fluid discharge manifold 15 which is similarly formed inside the back-up member 4. The manifolds 14 and 15 respectively include piping portions 14a and 15a and common collecting chambers 14b and 15b. The piping portions 14a and 15a are respectively connected to the respective inlets 12 and outlets 13, and the common collecting chambers 14b and 15b respectively communicate with the piping portions 14a and 15a. The collecting chambers 14b and 15b are closed off by the bank plate 5 and communicate with the outside via conducting pipes 16 and 17.

A vent manifold 18 that communicates with the vent holes (described later) of the metal mold 2 is formed in the back-up member 4. The vent manifold 18 is comprised of piping portions 18a and a common collecting chamber 18b with which these piping portions 18a communicate. This collecting chamber 18b is closed off by the back plate 5 and communicates with the outside via a conducting pipe not shown in the drawings.

Small vent holes 19 are formed in the cavity portion 3 of the metal mold 2 and led to the inside surface. The vent holes 19 communicate with the piping portions 18a of the vent manifold 18 via piping portions 20 inside the metal mold 2. As seen from FIG. 3, the vent holes 19 and piping portions 20 of the metal mold 2 and the piping portions 18a of the vent manifold 18 are disposed between the recessed grooves 11 of the back-up member 4.

From the standpoint of rapid heating and rapid cooling, and from the standpoint of energy consumption, it is preferable that the thickness of the metal mold 2 be thin. However, if the metal mold is too thin, irregularity in heating or cooling tends to occur at the surface of the metal mold 2; and further when pressing force of blow molding is applied, deformation occurs, making it difficult to maintain the desired cavity shape. The thickness of the metal mold 2 is set with consideration given to these points. If the material of the metal mold 2 is an aluminum alloy, the thickness may be set in the range of, for example, 4 to 15 mm, with the shape and size, etc. of the cavity portion taken into account. By way of setting the thickness of the metal mold 2 as small as this, the thermal capacity is reduced, rapid heating and rapid cooling are possible, and the energy consumption is reduced.

The back surface of the metal mold 2 and the surface of the back-up member 4 adhere tightly to each other so that the cross sections of the recessed grooves 11 are closed, thus forming flattened fluid flow grooves. The depth of these fluid flow grooves (or the recessed grooves 11) is appropriately set with consideration given to the quantity of heat that is exchanged by heat exchange. However, if the fluid is caused to pass through at a high speed, the heat exchange efficiency is high, the amount of fluid that flows through is relatively small, and the amount of energy that is consumed is small; accordingly, the above-described depth is selected from a range of, for example, 0.5 to 7 mm. If the depth of the fluid flow grooves is greater than such values, then the fluid flows only in the center of the depth, and the heat exchange efficiency does increase. The depth value is preferably selected from a range of 0.5 to 3 mm. The width of the grooves is to be set appropriately, and the width is selected, for instance, from a range of 10 to 50 mm. If the width is outside this range, irregularity occurs in the cooling rate or heating rate in the direction of width. The width value is preferably selected from a range of 10 to 40 mm.

In order to prevent the leakage of fluid from the fluid flow grooves (recessed grooves 11), gaskets can be interposed, if necessary, around the peripheries of the recessed grooves 11 between the back surface of the metal mold 2 and the surface of the back-up member 4. Gaskets can be interposed also around the peripheries of the collecting chambers 14b and 15b between the back-up member 4 and the back plate 5 in order to prevent the leakage of fluid from these collecting chambers 14b and 15b of the manifolds 14 and 15.

In the above-described metal mold device 1, the heating fluid or cooling fluid enters the collecting chamber 14b of the fluid supply manifold 14 via the conducting pipe 16 from an external supply device, and such fluid is distributed into the respective piping portions 14a. From the respective piping portions 14a, the fluid enters the respective fluid flow grooves (recessed grooves 11) via the respective inlets 12 and flows at a high speed along the back surface of the metal mold 2. During this period, rapid heat exchange is performed between the fluid and the metal mold 2. The fluid reaching the end portions of the respective fluid flow grooves (recessed grooves 11) flows out into the respective piping portions 15a of the fluid discharge manifold 15 via the respective outlets 13 and enters the collecting chamber 15b, and then the fluid is discharged to the outside via the conducting pipe 17. The fluid supply manifold 14 has also the function of uniformly distributing the fluid among the respective fluid flow grooves (recessed grooves 11); and in addition to collecting the fluid discharged from the respective fluid flow grooves (recessed grooves 11), the fluid discharge manifold 15 has also the function of releasing the pressure of the steam formed by vaporization of the fluid that occurs when the fluid contacts the heated back surface of the metal mold during cooling.

In the above-described metal mold device 1, the collecting chamber of the vent manifold 18 can be communicated with a vacuum suction device, so that a vacuum can be applied. In this case, even if there fluid leakage occurs from the fluid flow grooves (recessed grooves 11), the fluid can be discharged via the piping portions 18a.

Alternatively, the leakage of air, etc. can be prevented by interposing O-rings, etc., around the peripheries of the contact portions between the piping portions 20 of the metal mold 2 and the piping potions 18a of the vent manifold 18.

In the above-described example, the piping portions 20 and piping portions 18a are disposed between the recessed grooves 11 (see FIG. 3); however, these piping portions can be provided inside the recessed grooves 11. In this case, it is necessary to close off the piping portions 20 and piping portions 18a from the fluid flow grooves (recessed grooves 11) so that the heating fluid or cooling fluid does not enter the piping portions 20 and piping portions 18a.

Figure 4:
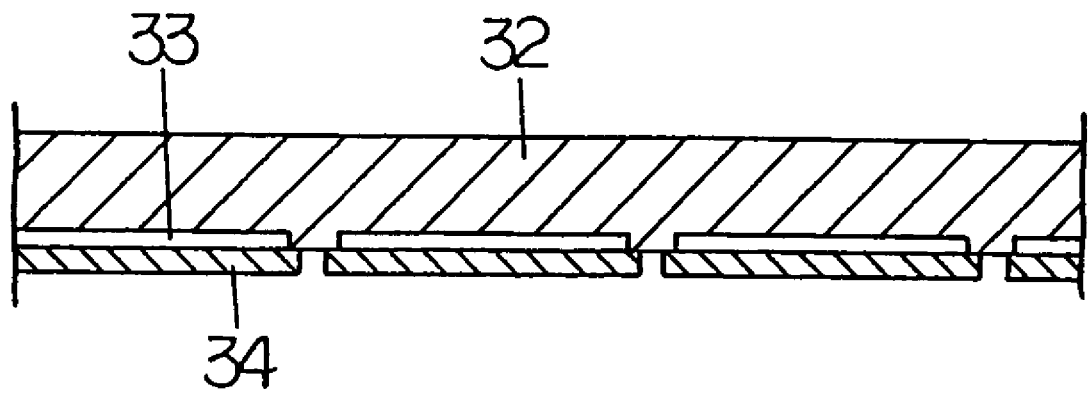
FIG. 4 is a sectional view that illustrates another method of forming the fluid flow grooves.
Figure 4:
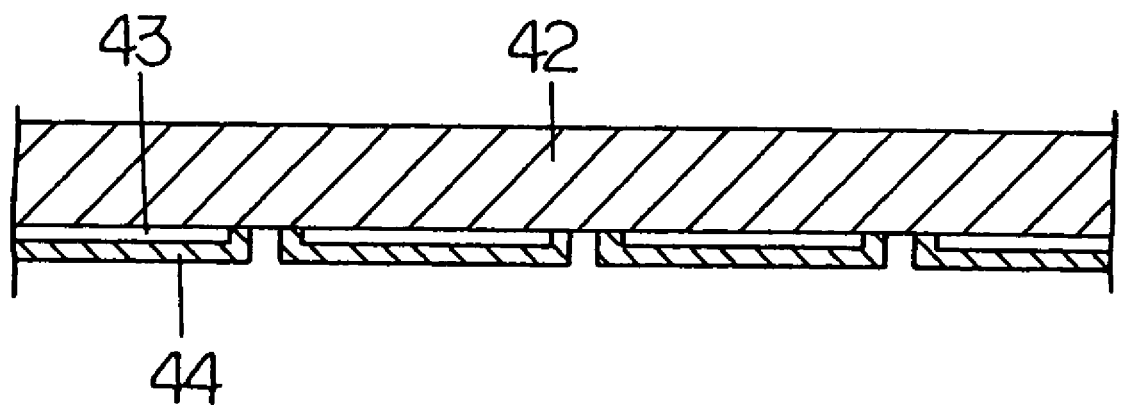

In the above-described example, the back-up member is disposed inside the metal mold structural body, the fluid supply manifold and fluid discharge manifold are formed in the back-up member itself, and the vent manifold, etc. are also provided in the back-up member. However, it is possible to limit the role of the back-up member to the formation of fluid flow grooves between the back-up member and the back surface of the metal mold as shown in FIG. 4. More specifically, in FIG. 4(a), flattened recessed grooves 33 are formed in the back surface of the metal mold 32 in a configuration similar to that of the above-described recessed grooves 11, and fluid flow grooves (or the recessed grooves 33) are formed by covering these recessed grooves 33 with a plate-form back-up member 34. In FIG. 4(b), a plate form back-up member 44 which has recessed grooves 43 of a configuration similar to that of the above-described recessed grooves 11 is disposed on the back surface of a metal mold 42 similar to the metal mold 2, so that fluid flow grooves (or the recessed grooves 43) are formed thereby. In the above examples, it is necessary to separately install a fluid supply manifold that supplies the fluid to the fluid flow grooves and a fluid discharge manifold that discharges the fluid from the fluid flow grooves, so that these manifolds communicate with the fluid flow grooves.

Next, the metal mold device for blow molding according to the present invention will be described more concretely with reference to FIGS. 5 through 7.

Figure 5:
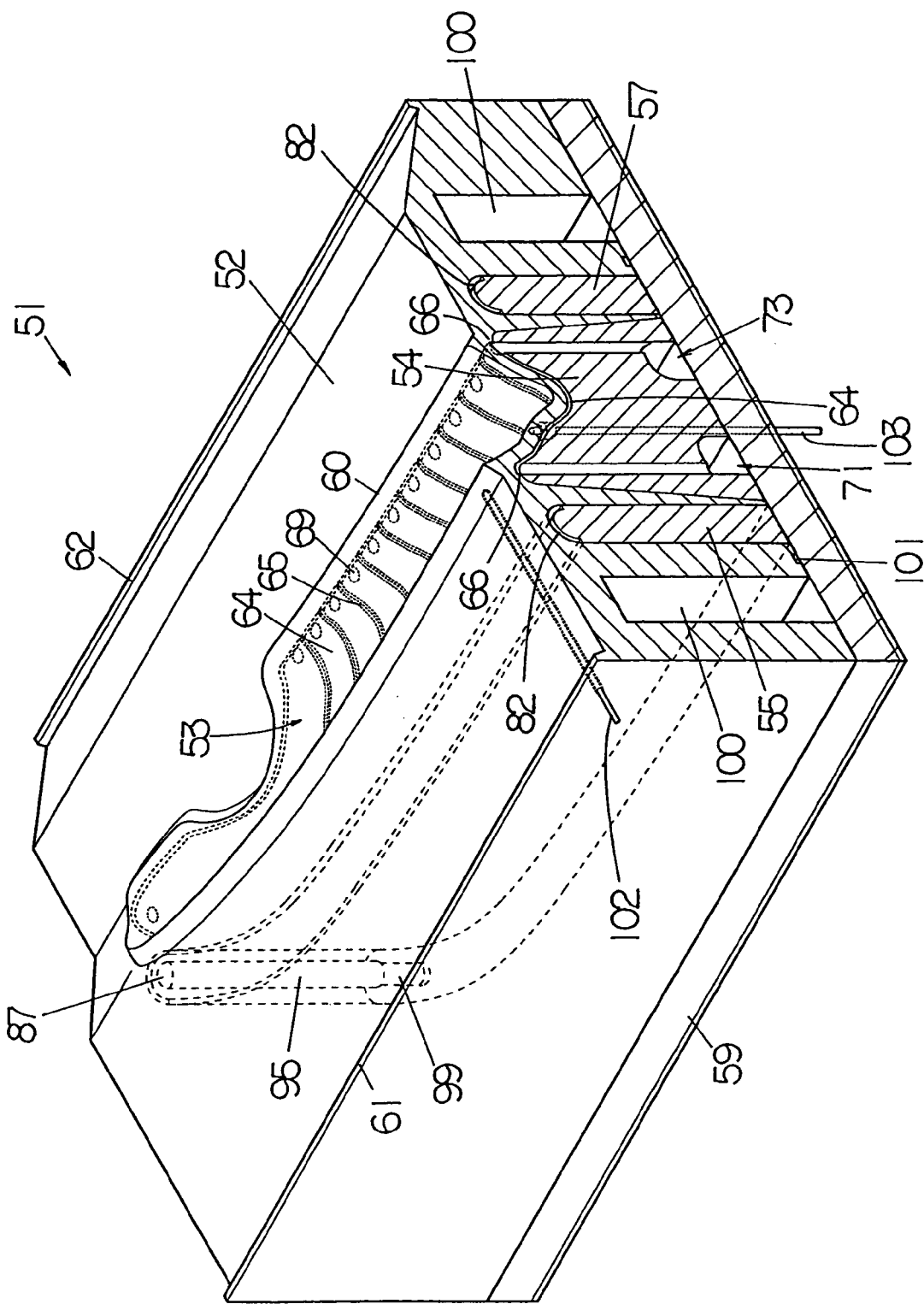
FIG. 5 is a perspective view (sectioned along the line III—III in FIG. 7) which illustrates, in more concrete terms, the metal mold device for blow molding according to the present invention.
Figure 6:
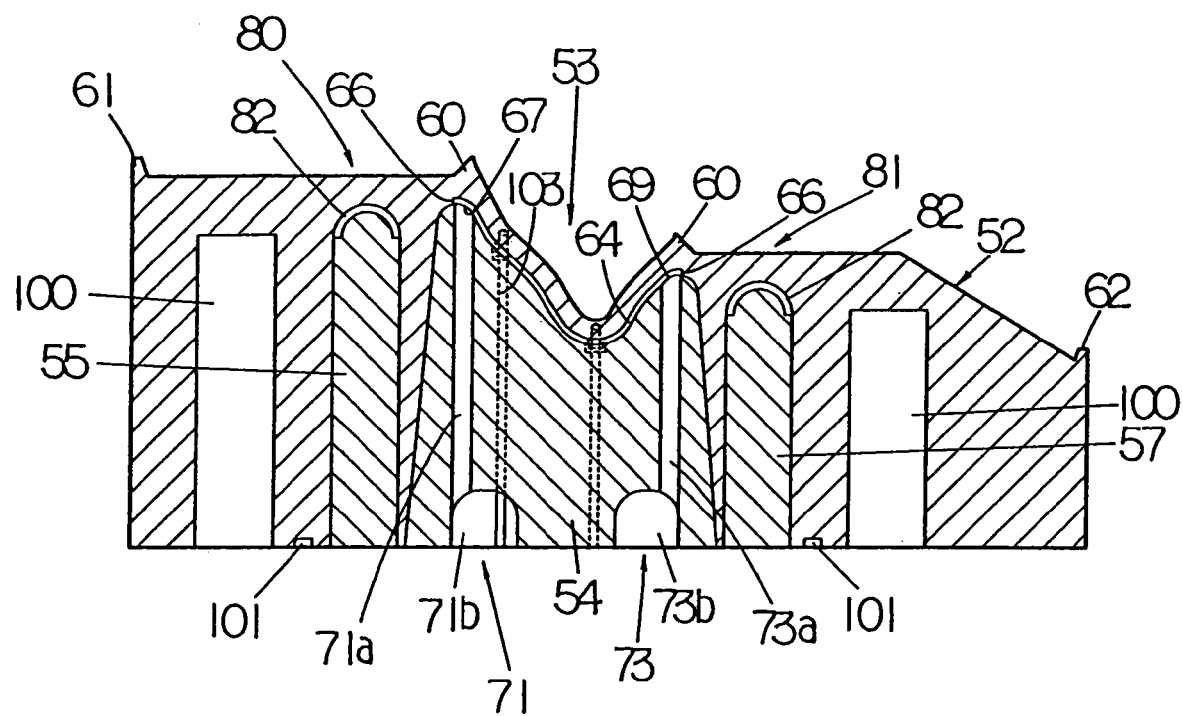
FIG. 6 is a sectional view (along the line III—III in FIG. 7) thereof.
Figure 7:
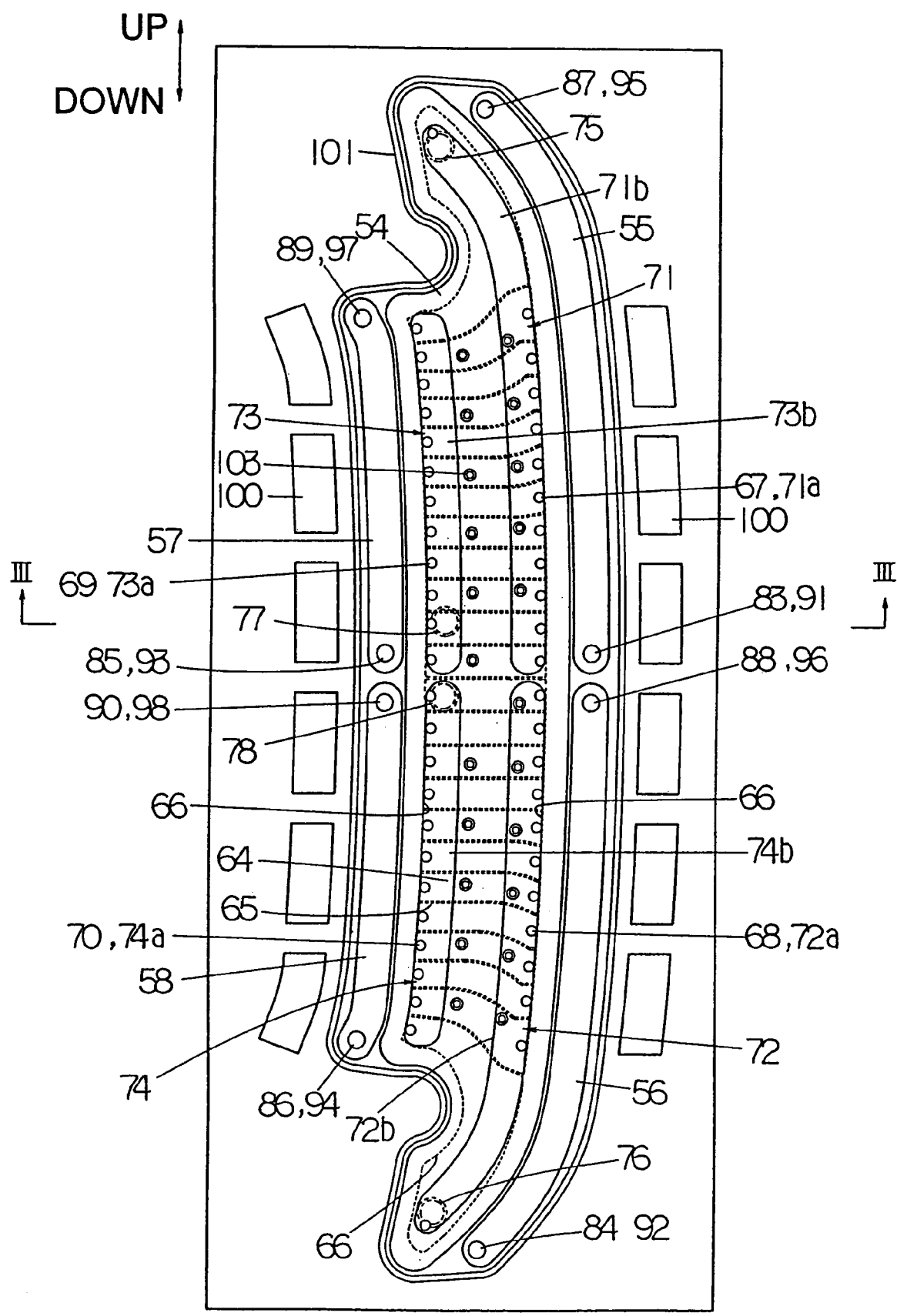
FIG. 7 is a bottom view that shows the structure of the metal mold and back-up member with the back plate removed.

The metal mold device 51 for blow molding shown in FIGS. 5 through 7 (only one side of the device is shown) is used to manufacture a rear spoiler for automobiles, and it comprises a metal mold 52 which has a cavity portion 53, back-up members 54 through 58 which are disposed inside the metal mold structural body and on the back surface side of the metal mold, and a back plate 59 which supports the back of the metal mold 52. The cavity portion 53 is in the range surrounded by the pinch-off portions 60, and contact portions 61 and 62 are formed on the left and right ends of the metal mold 52. The metal mold device 51 for blow molding is disposed so that the direction of length of the cavity portion 53 is vertically oriented (the vertical direction is shown in FIG. 7), and the parison is disposed in the direction of length of the cavity portion 53.

The cavity portion 53 of the metal mold 52 is formed with a small thickness, and numerous flattened recessed grooves 64 are formed in the back surface. The grooves are provided so as to be densely concentrated in parallel with partition walls 65, which have a small thickness, interposed between the grooves. The respective recessed grooves 64 are surrounded by the partition walls 65 and dikes 66 that are around the periphery of the back surface of the cavity portion 53.

The back-up member 54 is disposed in the central portion inside the structural body of the metal mold 52 (or in the hollow portion on the back side of the cavity portion 53), and the surface of this back-up member 54 is caused to adhere tightly to the partition walls 65 and dikes 66 on the back surface of the cavity portion 53. As a result, the cross sections of the recessed grooves 64 are closed off, and flattened fluid flow grooves are formed. Furthermore, inlet/outlets 67 and 68 (as shown in FIG. 7, and the inlet/outlets in the upper half are designated by the reference numeral 67, and the inlet/outlets in the lower half are designated by the reference numeral 68) are formed in the surface of the back-up member 54 in locations that correspond to one end portion of each recessed groove 64, and inlet/outlets 69 and 70 (as shown in FIG. 7; and the inlet/outlets in the upper half part are designated by the reference number 69, and the inlet/outlets in the lower half part are designated by the reference number 70) are formed in locations that correspond to the other end portion of each recessed groove 64. The respective inlet/outlets 67 through 70 communicate with manifolds 71 through 74 formed inside the back-up member 54. The manifolds 71 through 74 are respectively comprised of piping portions 71a through 74a, which connect with the respective inlet/outlet 67 through 70, and common collecting chambers 71b through 74b, which are formed in the back surface side of the back-up member 54. The collecting chambers 71b through 74b are closed off by a back plate 59; and in this back plate 59, communicating holes 75 through 78 (indicated by dotted imaginary lines in FIG. 7) that cause the collecting chambers 71b through 74b to communicate with the outside are formed.

In cases where water is used as a cooling medium and steam is used as a heating medium, water is supplied to the collecting chambers 72b and 73b of the manifolds 72 and 73 via the communicating holes 76 and 77 during cooling. This water passes through the piping portions 72a and 73a and the inlet/outlets 68 and 69 and enters the fluid flow grooves (recessed grooves 64). The water flows along these fluid flow grooves and enters the collecting chambers 74b and 71b via the inlet/outlets 70 and 67 and the piping portions 74a and 71a of the manifolds 74 and 71. The water is then discharged to the outside via the communicating holes 78 and 75. During heating, steam flows through in the direction opposite from the direction of flow of the water during cooling described above.

Side portions 80 and 81 of the cavity portion 53 of the metal mold 52 are formed so that both of these side portions are thin along the direction of length, and the back surfaces have a semicircular shape in cross section. The back-up members 55 through 58 are disposed inside the structural body of the metal mold 52 (in the hollow portions on the back sides of both side portions 80 and 81), and the front surfaces are disposed at a specified distance from the back surfaces of both side portions 80 and 81. As a result, flattened circular-arc-form cooling water flow grooves 82 whose cross sections are closed off are formed. Furthermore, inlets 83 through 86 and outlets 87 through 90 are formed on the surfaces of the back-up members 55 through 58 in locations that correspond to both side portions of the respective cooling water flow grooves 82. The respective inlets 83 through 86 and outlets 87 through 90 communicate with cooling water inlet passages 91 through 94 and cooling water outlet passages 95 through 98 similarly formed inside the back-up members 55 through 58 and further with inlet holes and outlet holes (the outlet holes 99 are shown in FIG. 5) formed in the back plate 59.

The reference numeral 100 indicates hollow spaces formed in order to reduce the weight, 101 indicates an annular gasket that prevents the leakage of fluid, 102 indicates a temperature detection sensor, and 103 indicates vent pipes that communicate with vent holes formed in the cavity portion 53 of the metal mold 52.

In the present invention, since flattened fluid flow grooves are formed by the metal mold for blow molding and back-up members that adhere tightly to the back surface of this mold, the heating fluid or cooling fluid directly contacts the back surface of the metal mold; furthermore, the fluid flow grooves are densely concentrated on the back surface of the metal mold. Accordingly, an increased contact area between the metal mold and the fluid is secured, and a superior heat exchange efficiency is obtained. Thus, rapid heating and rapid cooling of the metal mold are possible, the cycle time can be shortened, and the energy consumption can also be reduced.

Furthermore, since a plurality of fluid flow grooves are disposed with partition walls in between, and since fluid inlets and outlets are formed in the respective fluid flow grooves, local stagnation of the fluid in the fluid flow grooves tends not to occur, and heating or cooling with no irregularity overall can be accomplished.

The invention claimed is:

1. A metal mold device for blow molding characterized in that:
fluid flow grooves with a flat cross section are formed between a back surface of a metal mold which is used for blow molding and a back-up member which is disposed so as to adhere tightly to said back surface, said flat cross section being flattened along said back surface of said metal mold,
said fluid flow grooves are provided in a plurality of numbers and are disposed so that said grooves are densely concentrated witH partition walls, which have a narrow width, interposed, and
fluid inlet openings and outlet openings are formed in each of said fluid flow grooves, said fluid inlet openings being at one end thereof and said outlet openings being at another end thereof;
wherein heating or cooling of said metal mold is accomplished by causing a heating fluid or cooling fluid to flow through each of said fluid flow grooves.

2. The metal mold device for blow molding according to claim 1 characterized in that said flat cross section of each of said fluid flow grooves has a width of 10–50 mm and a depth of 0.5–7 mm on said back surface of said metal mold.

3. The metal mold device for blow molding according to claim 2 characterized in that said fluid flow grooves have a depth of 0.5–3 mm.

4. The metal mold device for blow molding according to claim 1, 2 or 3 characterized in that said inlets and outlets are formed in said back-up member.

5. The metal mold device for blow molding according to claim 1, 2 or 3 characterized in that said inlets and outlets of said respective fluid flow grooves respectively communicate with a piping of a supply or discharge manifold.

6. The metal mold device for blow molding according to claim 4 characterized in that said inlet and outlet of each one of said fluid flow grooves are respectively communicated with a piping of a fluid supply manifold and a piping of a fluid discharge manifold.

* * * * *